June 5, 1934.          R. A. MUELLER          1,961,380
EQUALIZING DEVICE FOR HIGH PRESSURE VALVES
Filed Sept. 30, 1932

Inventor
Robert A. Mueller
Jesse R. Stone
Lester B. Clark
By
Attorneys

Patented June 5, 1934

1,961,380

UNITED STATES PATENT OFFICE 1,961,380

EQUALIZING DEVICE FOR HIGH PRESSURE VALVES

Robert A. Mueller, Houston, Tex.

Application September 30, 1932, Serial No. 635,467

3 Claims. (Cl. 137—78)

My invention relates to valves to be employed in high pressure fluid conducting lines. It is particularly adapted for use in work relative to deep wells where high gas pressures are encountered.

It is a common difficulty in operating valves in lines conducting fluid under high pressures that the valve is exceedingly difficult to operate when the pressure is on. Gate valves employed in the flow line extended from the well are sometimes almost impossible to open due to the high gas pressure on the up-stream side of the valve. It is not uncommon to encounter pressures in excess of 1,000 pounds per square inch, and sometimes the pressures are far in excess of this.

It is an object of my invention to provide an attachment for valves whereby the fluid pressures may be equalized on both sides of the valve, so that the valve may be operated easily.

I desire to provide a means whereby pressure fluid may be enclosed in the space on the downstream side of the valve, so as to build up a pressure equaling that on the up-stream side.

Figure 1:
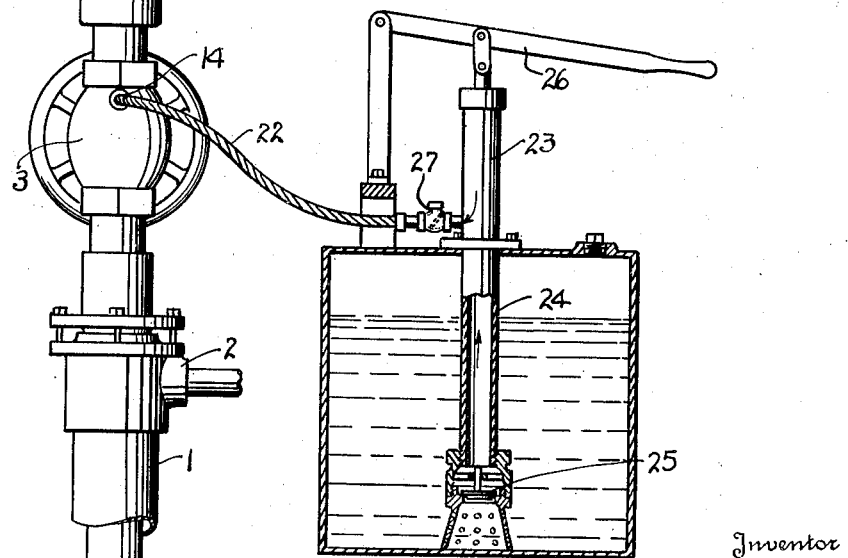

In the drawing herewith Fig. 1 is a side elevation of the upper portion of a well equipment, certain parts being broken away for greater clearness, and illustrating a means of equalizing the pressures in accordance with my invention.

Figure 2:
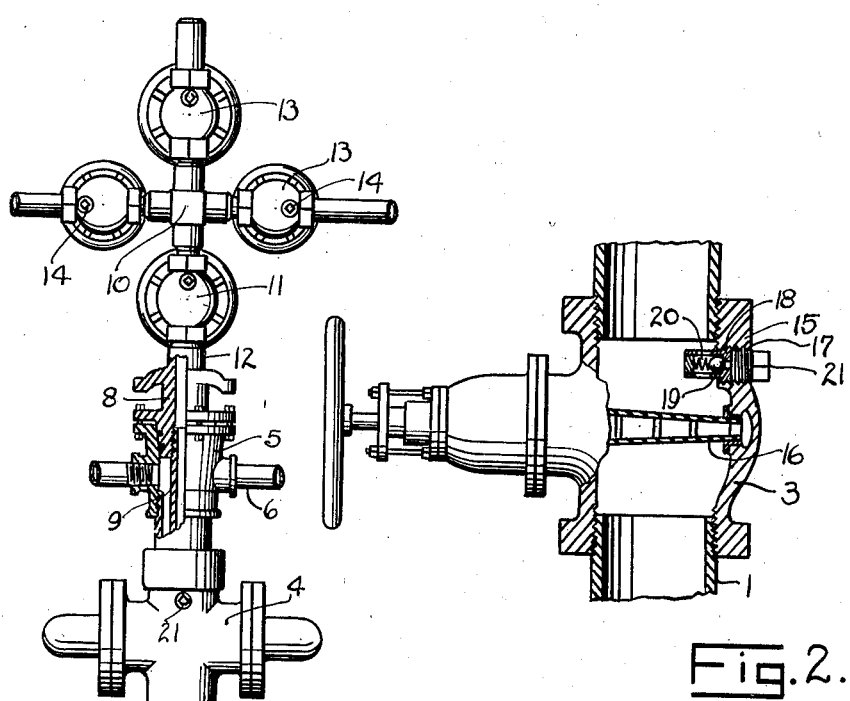

Fig. 2 is a side view partly in elevation and partly in central longitudinal section, illustrating a gate valve equipped with the invention.

I have illustrated the application of my invention to the equipment at the upper end of a producing well. In Fig. 1 the casing 1 is shown as provided with a side outlet 2 which may be controlled through a valve not shown. Above the outlet and connected in the casing liner is a large control valve 3 of the gate valve type. Above this valve I have illustrated somewhat diagrammatically a blow-out preventer 4.

Above the blow-out preventer is the usual casing-head 5, having lateral outlets 6 therefrom and a tapered seat 7 formed at the upper end to receive the bushing 8 attached to the upper end of the tubing 9. Said bushing forms an extension of the tubing above the casinghead and is connected to a cross-shaped fitting 10, forming a part of the Christmas tree. A gate valve 11 is formed in the flow line 12 below the Christmas tree, and each of the branch lines from the cross 10 are also controlled by gate valves 13.

Any of the gate valves disclosed in the line may have to be operated in the handling of the well and may be difficult to operate, depending upon the pressure encountered. My equalizing means may be employed at 14 upon any of these valves. The construction of the device is best disclosed in Fig. 2. I form in the wall 15 of the valve housing and on the down-stream side of the gate member 16 a threaded opening 17, in which may be screwed a small housing 18 for a check valve 19, which fits within a seat in the housing and is normally held outwardly in closed position by a spring 20. Normally the threaded opening 17 outside the valve housing is closed by a threaded plug 21.

The threaded opening in which the plug is screwed may be employed to engage with a flexible line 22 upon a pressure pump 23.

The pump 23 is one now old in the art; it includes a pump barrel 24, having an upwardly opening valve 25 at the lower end and a plunger working in the barrel is operated by a handle 26 in the usual manner. The outlet from the pump barrel is through an outwardly opening check valve 27 connected in the flexible line 22, which is formed at its free end with a threaded attachment adapted to engage within the seat 17 in the valve housing.

In using my device and high pressures are encountered which make it difficult or impossible to open any of the valves in the line, the pressure pump is then employed to equalize the pressure on the down-stream side of the valve with that on the up-stream side. To do this, the valves above the one to be opened are closed so as to form a closed chamber above the valve to be opened. The pump is then connected to force pressure fluid past the valve 19 to the interior of the valve housing and then operated until a pressure on the down-stream side has reached the desired value.

It will be seen that small pressure pumps now commonly employed in the art may be made easily available for use on my valves. When high pressures are encountered, it will be possible for one operator, without assistance, to control the valves in the line by the simple expedient of equalizing the pressure on the gate member of the valve in the manner just described.

It is of further advantage that the valve may be operated without injury thereto and without the consequent wear which is ordinarily encountered where a rush of fluid past the valve occurs in opening.

What I claim as new is:

1. A valve housing having a passage therethrough for fluid, a valve therein, adapted to close said passage through said housing, in combination with a threaded opening in the wall of said housing on the down-stream side of said valve, a check valve therein opening inwardly to allow fluid under pressure to be pumped into said housing to equalize the pressure on the up-stream side thereof.

2. A valve housing having a fluid passage, a valve movable to close said passage, an inwardly opening check valve closing an opening in the wall of said housing on the down-stream side thereof, and means to attach a pressure pump in the outer side of said opening.

3. A conducting line for fluids under pressure, a valve housing having a fluid passage connected in said line, a valve movable to close said passage, means to close said line on the down-stream side of said valve, and means connected with said valve housing on the down-stream side thereof including a valve control opening in the wall of said housing and a pump outside said line to force fluid through said opening into said passage to equalize fluid pressures on that side of the valve with those on the up-stream side thereof.

ROBERT A. MUELLER.